March 27, 1945.  W. C. GOGGIN ET AL  2,372,627
APPARATUS FOR STRETCHING CORDAGE
Filed Aug. 20, 1942

INVENTOR.
Alden W. Hanson
William C. Goggin
BY Lorne A. Matheson

Griswold & Burdick
ATTORNEYS

Patented Mar. 27, 1945

2,372,627

UNITED STATES PATENT OFFICE 2,372,627

APPARATUS FOR STRETCHING CORDAGE

William C. Goggin, Lorne A. Matheson, and Alden W. Hanson, Midland, Mich., assignors to The Dow Chemical Company, Midland, Mich., a corporation of Michigan Application August 20, 1942, Serial No. 455,430

4 Claims. (Cl. 28—71.3)

The invention relates to apparatus for imparting a permanent stretch to cordage. It more particularly concerns apparatus adapted to be used in stretching cordage fabricated from normally crystalline polymers, such as polymeric vinylidene chloride and certain copolymers thereof.

In producing cordage from polymeric vinylidene chloride it is customary to extrude the molten polymer through a die or orifice and to thereafter cool the extruded product. It is then desirable to stretch the extruded cord in order to orient the crystal structure of the polymer filament, with the result that the physical properties of the cordage are greatly enhanced.

It is, therefore, the principal object of the invention to provide an apparatus which may be employed to impart a permanent stretch to cordage, such as for example polymeric vinylidene chloride cordage.

Another object of the invention is to provide an apparatus which will automatically impart an amount of stretch to cords of various kinds which is dependent upon the susceptibility of the cord to stretch under a constant tension.

Another object of the invention is to provide an apparatus which will subject the cord to a stretching operation under a predetermined constant load whereby the various portions of the cord will be subjected to different amounts or degrees of stretch depending upon the ease or freedom with which these various portions tend to stretch.

Other objects and advantages will be apparent as the description of the invention proceeds.

The invention then resides in the apparatus hereinafter more fully described and particularly pointed out in the claims, the following description taken in connection with the drawing setting forth a mode of putting the invention into effect, such mode illustrating, however, but several of various ways of carrying out the invention.

Figure 1:
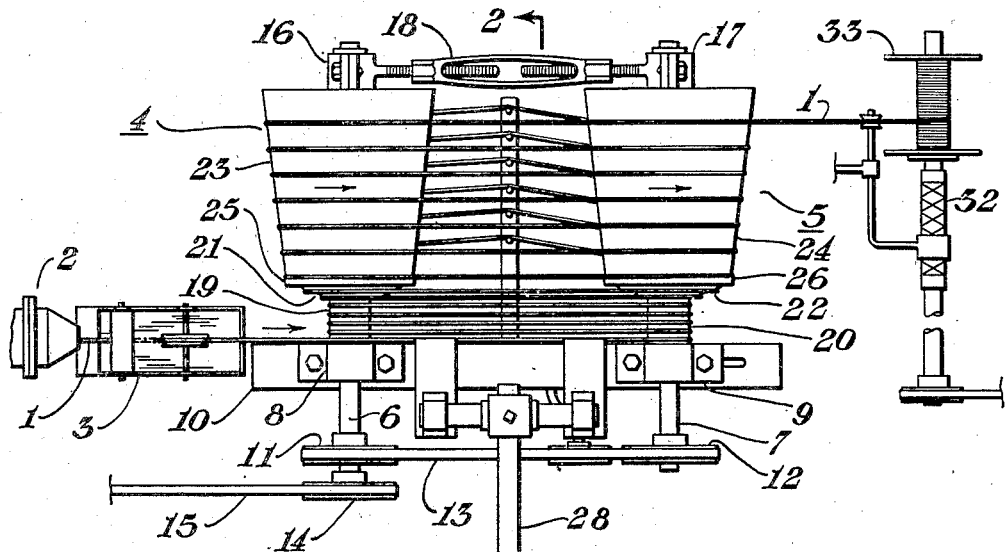
Fig. 1 is a top view of one form of apparatus illustrating the invention.

The embodiment of the invention illustrated in the drawing is particularly adapted to be employed in stretching the supercooled form of the normally crystalline vinylidene chloride polymer.

Figure 2:
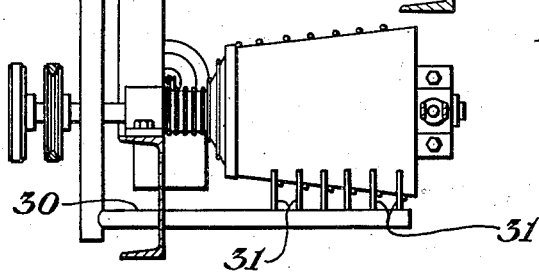
Fig. 2 is a sectional elevation taken on lines 2—2 of Fig. 1 looking in the direction of the arrows.

Referring more particularly to Figs. 1 and 2, the apparatus therein shown may be subdivided into means to supply cordage to the stretching mechanism; the roll means for stretching the cordage and mountings therefor, together with means to impart a constant load to the cordage during stretching; and take-up means for the finished filament.

The supply of cordage 1 to be elongated is produced at a substantially uniform rate from a conventional extruder 2 (shown only in part) and passed through a water bath 3 at 15° C. to chill and supercool it. Thereafter, the stretchable cordage is led onto a pair of suitably profiled rolls 4 and 5 fixedly mounted on rotatable shafts 6 and 7 journaled at one end in bearings 8 and 9 carried by frame 10. The ends of the shafts project through the bearings 8 and 9 and carry pulleys 11 and 12 interconnected by a belt 13 to insure rotation at the same speed. One of the shafts also carries a driven pulley 14 motivated by a belt 15 from a suitable power source (not shown). The opposite ends of the rotatable shafts are journaled in bearings 16 and 17 carried on the ends of a turnbuckle 18. This turnbuckle provides means to adjust the position of the rolls relative to each other.

The rolls 4 and 5 comprise small nontapered end portions 19 and 20, stepped portions 21 and 22 having grooved surfaces to prevent the slippage of cord therefrom, and tapered portions 23 and 24. The cordage 1 is wound several times around the small nontapered ends 19 and 20 to prevent slippage of the cord as necessary tension is thereafter applied to cause the cordage to stretch. The cordage is thereafter wound in consecutive runs on the stepped portions 21 and 22 of the rolls whereon the initial stretch is given the cordage. The cordage is thereafter fed onto the tapered portions 23 and 24 of the rolls where the final stretch is imparted to the cord. The tapered portions 23 and 24 may be suitably provided with a lip or rim portions 25 and 26 at the smaller diameter ends thereof, which serve to catch the cord and prevent its slipping off the tapered portions as it is caused to move in consecutive runs progressively up the larger diameter tapered portion of the rolls.

The loops of cordage on the tapered rolls are subjected to a tension maintained at a constant value by the action of a floatingly supported weight 27 shown in detail in Figs. 1 and 2. As shown in Fig. 2 the weight 27 is adjustably supported from a horizontal arm 28 which is in turn rigidly connected to a rod 29 depending at right angles to arm 28. Rod 29 is pivoted near its upper end upon a support 42 and is provided at its lower end with a second arm 30 which extends at right angles and in opposite direction from arm 28. The arm 30 extends under the cordage loops at a point between and below the rolls 4 and 5 and is provided with one or more upright guide pins 31, which are free to rotate upon making frictional contact with the cords, thus serving as idle pulleys. This arrangement applies tension to the cord loops by lateral pressure to hold them taut and take up variations in the pull of the cords caused by variations in the amount of stretching of the same.

A cord take-up mechanism is provided to receive the stretched cord as it leaves the rolls which consists, as shown in Fig. 1, of a level wind device designated generally by numeral 32, associated with a power driven reel 33. A universal electric motor is advantageously employed to drive the winding reel, the speed of which varies inversely with the pull on the cord, so that the latter is wound at a speed corresponding to the rate of feed which may be subject to slight variation.

Figure 3:
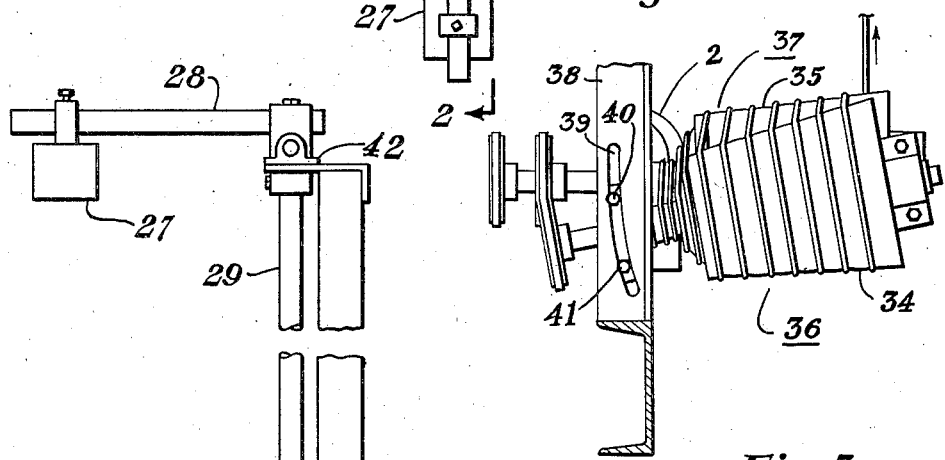
Fig. 3 is an end elevation looking at the rolls from the right end of the apparatus showing a modification of the roll structure of Figs. 1 and 2.

In Fig. 3 the apparatus is shown in slightly modified form. The tapered portions 34 and 35 of rolls 36 and 37 in the modification of Fig. 3 have been gouged or ground out at intervals to form a wavy surface. The crests and dips run directly around the tapered surface each having a constant radius rather than extending spirally over the roll surface. Additionally, roll 36 is mounted in such a manner that its longitudinal axis is adjustable in a vertical plane at one end only. This is accomplished by providing a suitable vertical brace member 38 in which is cut an arcuate slot 39 whereby the bolts 40 and 41 holding the bearing for the shaft of the near roll 36 can be adjusted so as to lower or raise the left hand end of the roll while the other end remains fixed but pivotally mounted in the turnbuckle bearings at the right end. The foregoing arrangement wherein the right end of the near roll can be lowered is desirable since the cord feeds up the tapered surface of the rolls without any tendency of the advancing runs to slip down to the smaller tapered end and chafe each other. Other than the modifications just described the apparatus of Fig. 3 is the same as that shown in Figs. 1 and 2.

The operation of the apparatus will be best understood from the following description of the actual operation of the apparatus in stretching polymeric vinylidene chloride cordage with the apparatus of Figs. 1 and 2. The cord coming from the extrusion head 2 is wound about the small nontapered portion of the rolls in several spaced runs to prevent slippage of the card. Thereafter the cord passes over the stepped portions 21 and 22 of the rolls and is then led onto the tapered surface of the rolls where it is advanced in spaced runs over the tapered surface to form a series of loops. The idle pulleys 31 engage the loops as shown in Figs. 1 and 2 and the loops therefore floatingly support the weight 27 through the action of lever arms 28, 29, and 30. Initial stretching of the cord takes place as the cord advances from the small diameter portion of the rolls over the stepped portion of the rolls while final stretching takes place as the cord advances over the tapered portion of the rolls. At the same time, as the cord advances over the tapered portion of the rolls, constant tension is applied to the cord by the floatingly supported weight so that any given section of the cord being forwarded to the take-up or receiving reel is subjected to the same stretching load regardless of any variation in the amount of stretching from section to section of the cord. It is clear that, if the cord reaching the tapered portion of the rolls is additionally stretched somewhat by the pressure due to the weight 27, the weight will fall and act through the pulley 31 to push the cord windings or loops to a larger diameter portion of the rolls. Similarly, if the cord is not stretched by the pressure of the pulleys the windings will not be advanced up the tapered surface and may even move down the tapered surface, so that the same stretching tension is applied to the cord even though the weight assumes different positions. A pair of tapered rolls will in general prove most satisfactory although only one roll need have a tapered surface to accomplish the desired result. In general, it will be preferable to employ the construction shown in Fig. 3 since the tendency of successive runs to chafe each other is eliminated due to the action of the diverging roll axes and the grooved or wavy roll surface.

It will be apparent that more or less tension can be applied to the cord by varying the mass of weight 27 or its position on the supporting arm 28. Additionally, if desired, the position and number of the idle pulleys 31 may be varied. For example, more or less tension can be applied to a particular cord by varying the spacing of the idle pulleys 31 positioned in the arm 30 between any two runs or loops so that one run will be forced to support a greater portion of the weight. For example, by increasing the spacing between any two idle pulleys the cord will of course be caused to move to a larger section of the tapered rolls and thus will be stretched more in a single run. This in turn causes the weight to do more work at this point, and hence more tension will be applied to a particular cord. The number of pulleys may be varied and, if desired, only a single one need be employed.

Although the apparatus has been described with particular reference to stretching normally crystalline polymeric vinylidene chloride, it is to be understood that it can be similarly used for stretching cords composed of other resins and materials capable of being subjected to a permanent elongation.

We claim:

1. In a cord stretching apparatus the combination which includes a cord supply means, power driven cord take-up mechanism, a pair of power driven spaced rolls having a tapered portion, a stepped portion, and a constant diameter portion around which the cord is wound in successive loops, a cord stretching weight arranged to apply tension directly to the looped portion of the cords extending around the tapered portion of the rolls.

2. In a cord stretching apparatus the combination which includes a cord supply means, power driven cord take-up mechanism, a pair of power driven spaced rolls the axes of which are divergingly adjustable so that the cord may be caused to advance on the rolls by adjusting the degree of divergence of the axes, said rolls having a tapered portion, a stepped portion, and a portion of constant diameter, and a weight arranged to apply tension directly to the looped portion of the cord extending around the tapered portion of the rolls.

3. In a cord stretching apparatus the combination which includes a cord supply means, power driven cord take-up mechanism, a pair of power driven spaced rolls both of which have a tapered portion and a stepped portion with their axes divergingly adjustable so that said rolls upon having the cord wound around the tapered portions thereon in successive runs tend to advance the cord up the tapered section of the rolls, and a cord stretching weight arranged to apply tension directly to the looped portions of the cord formed around the tapered portion of the rolls.

4. In a cord stretching apparatus the combination which includes a cord supply means, a power driven cord take-up mechanism, a pair of power driven spaced rolls adapted to receive the cord in spaced runs, each of said rolls having a tapered portion, a stepped portion, and a portion of constant diameter, said tapered portions having gouged out sections extending entirely around the circumference of the rolls, and a weight arranged to apply tension directly to the looped portion of the cord formed around the tapered portions of the rolls.

WILLIAM C. GOGGIN.
LORNE A. MATHESON.
ALDEN W. HANSON.